United States Patent
Dias et al.

(10) Patent No.: US 6,553,411 B1
(45) Date of Patent: Apr. 22, 2003

(54) SYSTEM AND METHOD FOR CACHE ACCELERATION

(75) Inventors: Daniel M. Dias, Mahopac, NY (US); Arun K. Iyengar, Yorktown Heights, NY (US); Daniela Rosu, Briarcliff Manor, NY (US); Renu Tewari, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/313,409

(22) Filed: May 18, 1999

(51) Int. Cl.[7] .............................................. G06F 15/16
(52) U.S. Cl. ........................... 709/219; 709/203; 711/3; 711/119
(58) Field of Search .................................. 709/217, 203, 709/201, 219; 707/10, 2, 8; 711/119, 3

(56) References Cited

U.S. PATENT DOCUMENTS

| | | | | |
|---|---|---|---|---|
| 6,014,667 A | * | 1/2000 | Jenkins et al. | 707/10 |
| 6,112,279 A | * | 8/2000 | Wang | 711/119 |
| 6,144,996 A | * | 11/2000 | Starnes et al. | 709/217 |
| 6,289,333 B1 | * | 9/2001 | Jawahar et al. | 709/203 |
| 6,298,356 B1 | * | 10/2001 | Jawahar et al. | 709/203 |
| 6,360,273 B1 | * | 3/2002 | Beurket et al. | 709/219 |
| 6,405,252 B1 | * | 6/2002 | Gupta et al. | 709/219 |

OTHER PUBLICATIONS

Tewari et al., "Beyond Hierarchies: Design Considerations for Distributed Caching on the Internet," Technical Report TR98–04, Department of Computer Sciences, University of Texas at Austin, pp. 1–22, Feb. 1998.

Abegnoli et al., "Design and Performance of a Web Server Accelerator," IBM Research, T.J. Watson Research Center.

Luotonen et al., "World–Wide Web Proxies," Computer Networks and ISDN Systems 27 (1994), 147–154.

Abrams et al., "Caching Proxies," Fourth International World Wide Web Conference Proceedings, World Wide Web Journal, Oct. 1995, pp. 119–133.

Caceres et al., "Web Proxy Caching: The Devil is in the Details," AT&T Labs–Research.

* cited by examiner

*Primary Examiner*—Wellington Chin
*Assistant Examiner*—Chuong Ho
(74) *Attorney, Agent, or Firm*—F. Chau & Associates, LLP

(57) ABSTRACT

A method, which may be implemented by a program storage device readable by machine, tangibly embodying a program of instructions executable by the machine to perform method steps for satisfying requests between a client and a server including the steps of providing a first entity with a directory of information about contents of a cache of a second entity, the first entity for receiving a request from a client, determining whether the directory of information indicates that the request is satisfied by the cache of the second entity by querying the directory of information on the first entity, sending the request to the second entity, if the directory indicates that the request is satisfied by the cache of the second entity, and otherwise, sending the request to be satisfied by another entity. A system is also included.

28 Claims, 2 Drawing Sheets

SYSTEM AND METHOD FOR CACHE ACCELERATION

BACKGROUND OF THE INVENTION

1. Field of the Invention

The present invention relates to caching information in computer systems, and more particularly to a method and system for accelerating cache memory in these computer systems.

2. Description of the Related Art

Computer systems may include caches for retaining information in a more accessible location to reduce fetch time and forego the need for recalculation of objects. Caching is commonly used for improving performance on many computer systems. By caching an object, the cost for fetching or creating the object is only incurred once. Subsequent requests for a cached object can be satisfied from the cache, a process which incurs significantly less overhead than recalculating the object or fetching it from a remote location.

Proxy caching is a technique used in conventional systems for storing data remotely from a Web site where the data permanently reside (see "Caching Proxies: Limitations and Potentials" by M. Abrams et al., "Fourth International World Wide Web Conference Proceedings," December 1996, pp. 119–133; and "World Wide Web Proxies" by A. Luotonen and K. Altis in "Computer Networks and ISDN Systems," vol. 27 (1994), pp. 147–154, both incorporated herein by reference). Proxy caches for major Internet Service Providers (ISP's) can receive huge volumes of requests. Consequently, performance is of critical importance for proxy caching.

One technique for improving performance of Web servers and proxy caches is to use a Web server accelerator (see, is e.g., "Design and Performance of a Web Server Accelerator," by E. Levy, A. Iyengar, J. Song, and D. Dias, Proceedings of INFOCOM'99, March 1999, incorporated herein by reference). For example, described therein is a Web server accelerator which runs under an embedded operating system optimized for communication. When used as a front end for one or more Web servers, the accelerator can dramatically increase the throughput of the Web site.

Another technique for improving proxy caching is to introduce large scale distributed caches, as described by R. Tewari, et al. in "Beyond Hierarchies: Design Considerations for Distributed Caching on the Internet", Technical Report TR98-04, Department of Computer Sciences, University of Texas at Austin, February 1998. The techniques developed therein are for improving the performance of a set of distributed caches by sharing information among the caches. However, these techniques do not improve the performance of individual proxy cache nodes.

A Web server accelerator can also be placed in front of a proxy cache to improve the performance of the proxy cache. Using this approach, requests to the site would initially go to the accelerator. If the requested document were contained in the accelerator cache, it would be returned without contacting the proxy server on which the proxy cache runs. If the requested document were not contained in the accelerator cache, however, the request would then go to the proxy server.

The Web server accelerator will improve performance a moderate amount using this configuration. The improvement in throughput will likely be less than a factor of two, however, because most requests will result in misses at both the accelerator and proxy cache. One reason for this may be that various studies have shown that in general, less than 50% of documents on the Web can be cached at proxies (see "Web Proxy Caching: The Devil is in the Details" by Caceres, Douglis, Feldman, Glass, and Rabinovich, Proceedings of WISP '99). Requests for uncacheable documents will result in cache misses at both the accelerator and proxy caches.

Therefore, a need exists for a system and method for accelerating cache throughputs for computer systems. A further need exists for providing a method for significantly improving performance at proxy servers.

SUMMARY OF THE INVENTION

A method, which may be implemented by a program storage device readable by machine, tangibly embodying a program of instructions executable by the machine to perform method steps for satisfying requests between a client and a server including the steps of providing a first entity with a directory of information about contents of a cache of a second entity, the first entity for receiving a request from a client, determining whether the directory of information indicates that the request is satisfied by the cache of the second entity by querying the directory of information on the first entity, sending the request to the second entity, if the directory indicates that the request is satisfied by the cache of the second entity, and otherwise, sending the request to be satisfied by another entity. In other methods, which may be implemented by a program storage device, the first entity is preferably an accelerator. The accelerator may include at least one cache and the method may include the step of attempting to satisfy requests from a client by employing the at least one cache. In response to the at least one cache on the accelerator including insufficient space, the step of storing data in the cache of the second entity may be included. The second entity may include a proxy server. The step of compressing information included in the directory of information for referencing data in the cache may be included. The step of compressing information may include compressing at least some of the information using a hash function. The directory of information may include hints of information included in the cache of the second entity.

In accordance with the present invention, a system for accelerating interactions between a client and a server includes an accelerator communicating directly with the at least one client for receiving requests. A proxy server is coupled to the accelerator and includes a first cache. The proxy server can satisfy client requests for objects. The accelerator includes a proxy directory for storing information about objects included in the first cache such that the accelerator has access to information about objects stored in the first cache thereby preventing the need to access the proxy server for objects not included in the first cache.

In alternate embodiments, the system may include a plurality of accelerators. The system may include a plurality of proxy servers. The proxy server may include a Web server. The accelerator may include a second cache, the accelerator being adapted for satisfying client requests for objects by employing the second cache. Remote servers may be included for providing requested objects unavailable from the first cache and second cache. The system may include additional caches on the proxy server for storing an object when insufficient space is available on the first cache and/or second cache. The proxy directory may include compressed information for referencing objects in the first cache. At least a portion of the compressed information may be compressed using a hash function. The proxy directory may include hints of information included in the first cache.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention is related to cache acceleration for computer systems and, more particularly, to a system and method for improving cache capabilities for computer systems. The present invention provides a method whereby the vast majority of requests to a proxy server bypass the proxy server. Consequently, the present invention improves throughput of the site by a factor greater than about two over the conventional approach as described above. One aspect of the present invention is a directory for a cache remotely disposed from the server on which the cache is employed.

The present invention may use one or more accelerators in front of one or more proxy servers. Another aspect of the present invention includes maintaining directory information about contents of a proxy server cache(s) at the accelerator(s). When a request is received by an accelerator, the accelerator attempts to satisfy the request from the accelerator's cache. If the requested object is not included in the accelerator cache, the accelerator determines if the object is included in a proxy server cache. If in the proxy server cache, the request is sent to the appropriate proxy server. Otherwise, the request is forwarded to the appropriate server elsewhere on the Internet, for example, by the accelerator. These requests are not processed by a proxy server at the site being accelerated. It is to be understood that a server is an entity which responds to requests from a client. It may comprise a single computer or multiple computers with accompanying hardware and software. These multiple computers may be but are not necessarily connected by one or more networks.

For the present invention, the only requests which the proxy server(s) sees are requests for objects included in a proxy cache, but not in an accelerator cache. Illustratively, this may constitute around 10% of requests at a typical proxy server. An accelerator constructed in accordance with the invention improves the throughput of such a system by a factor of about 10. By contrast, the conventional approach would send well over 50% of requests to a proxy server. An ideal accelerator with infinite throughput would only be able to improve the throughput of such a conventional system by a factor less than 2.

Figure 1:
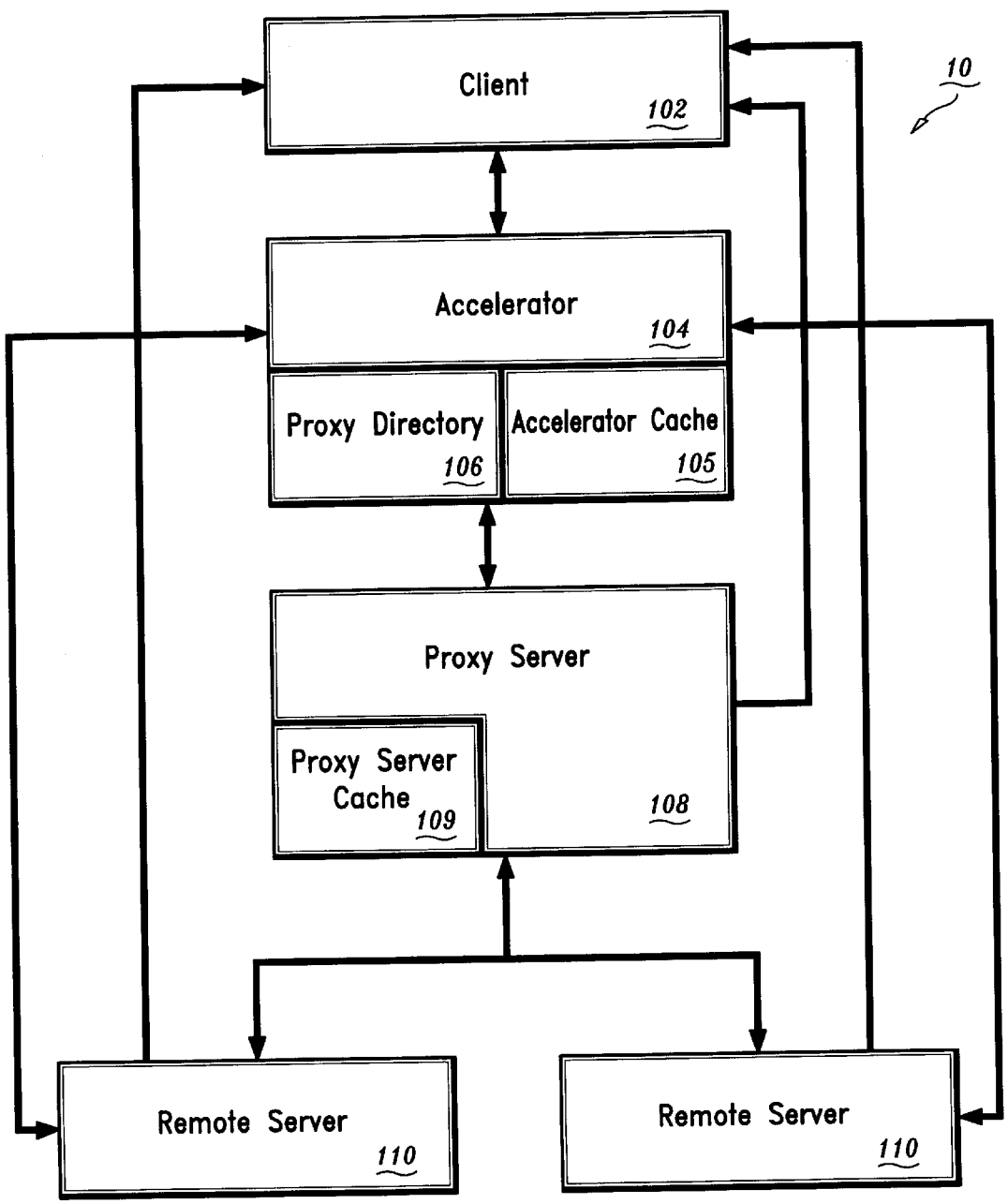
FIG. 1 is a block diagram for a system for accelerating and satisfying object requests in accordance with the present invention.
Figure 2:
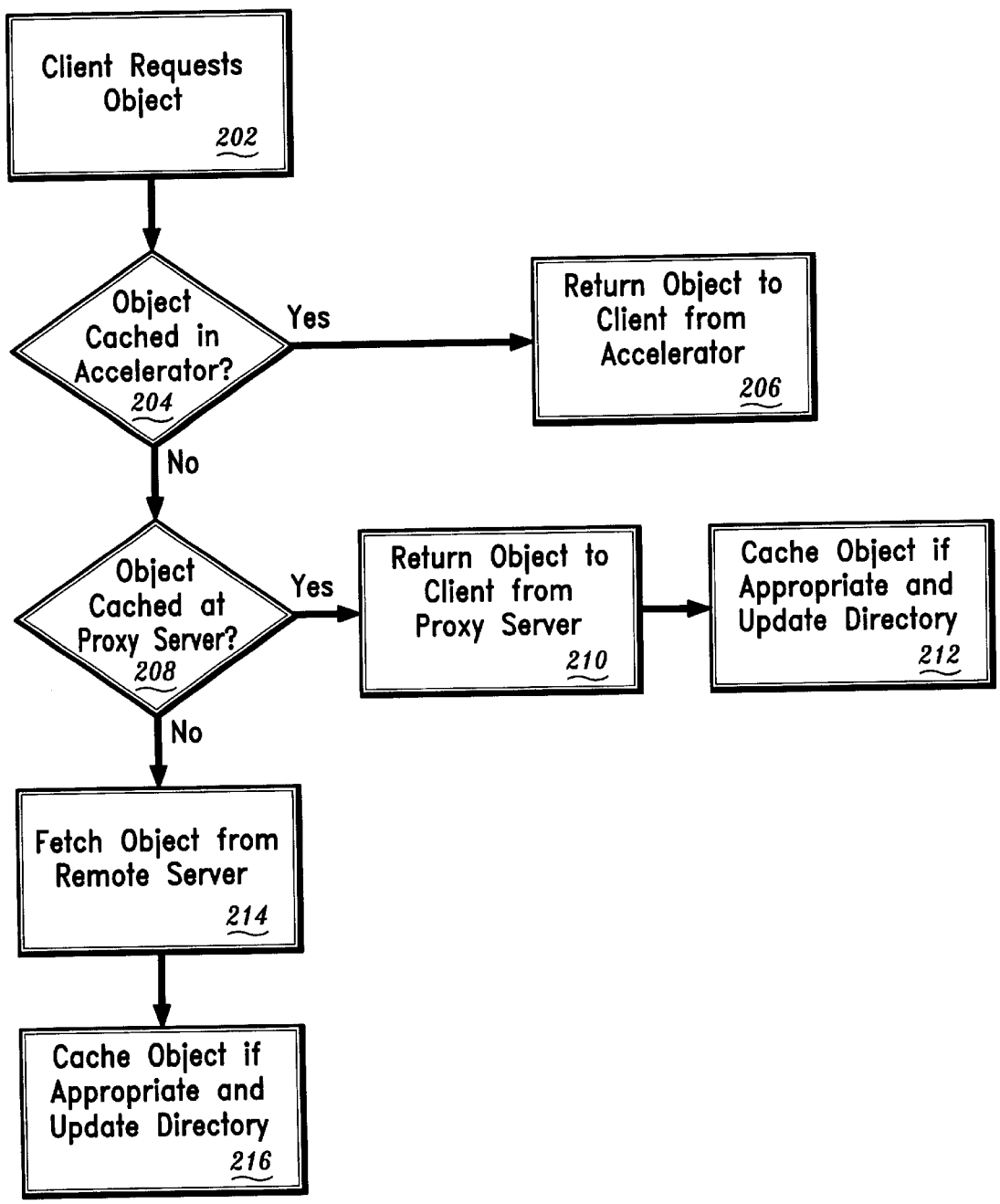
FIG. 2 is a block diagram of a method for cache acceleration in accordance with the present invention.

It should be understood that the elements shown in FIGS. 1–2 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a system 10 is shown depicting elements and components of the present invention. A client 102 requests objects from accelerator 104. Illustratively, FIG.1 depicts one proxy server 108 and one accelerator 104, however, the system 10 may include multiple proxy servers 108 and/or multiple accelerators 104. Further caches 105 and 109 are shown as a single block, however multiple caches may be employed. Arrows depicted in FIG. 1 represent communication flows in the system 10. In addition to communication flows shown in FIG. 1, other communication flows are possible. For example, clients 102 may communicate directly with the remote servers 110. Further, the clients 102 may directly communicate with proxy servers 108.

Proxy server 108 is a server which interfaces to a network (i.e. a gateway for network traffic) and includes one or more proxy caches. Accelerator 104 is a system used to improve performance of services on a network. One example of an accelerator is described in "Design and Performance of a Web Server Accelerator," by E. Levy, A. Iyengar, J. Song, and D. Dias, Proceedings of INFOCOM'99, March 1999, previously incorporated herein by reference. A remote server 110 is a server which is remotely disposed relative to proxy server 108.

Referring to FIG. 2 with continued reference to FIG. 1, a flow diagram of a method for cache acceleration is shown. In step 202, a client 102 requests an object. A client 102 may include an individual computer or a network of computers. Client 102 may request an object by attempting to access a web page, or objects included therein, for example. In step 204, it is determined if the requested object is cached in an accelerator 104. This determination is performed by searching a directory of the information included in an accelerator cache 105. The directory for the accelerator cache 105 is searched in accordance with known techniques. If the accelerator cache 105 includes the requested object, the object is returned to the client 102 in Step 206. If the accelerator cache 105 does not include the object, the accelerator 104 determines in step 208 if the object may be cached at a proxy server 108. The accelerator 104 makes this determination by examining a proxy directory 106 which includes information about objects cached in proxy server cache 109.

If the requested object is cached at proxy server 108 in the proxy server cache 109 as determined at step 208, processing continues to step 210. In step 210, the proxy server 108 including a cached copy of the requested object is contacted by the accelerator 104 and returns the requested object to the client 102. In step 212, the system 10 determines whether the requested object should be cached at the accelerator 104. The system 10 may optionally maintain information on objects indicating how desirable it is to cache the objects. Such information may include but is not limited to frequency of accesses, size, cost to generate and/or fetch, and expected lifetimes. Such information may be updated at various times, such as when an object is requested. This information may be used to determine which objects should be stored in a cache.

If the determination of step 208 finds that the requested object is not stored in proxy server cache 109, the requested object is fetched from a remote server 110 in step 214. Step 214 is performed by the accelerator 104 and advantageously does not incur overhead at the proxy server 108. In step 216, the system 10 determines whether the requested object should be cached at the accelerator 104 and/or the proxy server 108. The system 10 may maintain auxiliary information as described earlier to aid in this decision, for example, the information may include but is not limited to frequency of accesses, size, cost to generate and/or fetch, and expected lifetimes.

When the contents of the cache 109 in the proxy server 108 changes, the appropriate proxy directories 106 are updated accordingly. In some cases, all cache space in the accelerator 104 may be used up. It may thus be desirable to store information which cannot be cached in the accelerator 104 in the cache 109 at the proxy server 108. This may be employed in step 216, for example. If passing data from the accelerator 104 to the proxy server 108 incurs significant overhead, the percentage of objects which overflow the accelerator cache 105 and are sent to the proxy server cache 109 may be varied accordingly. In other words, some objects which overflow the accelerator cache 105 would be cached at the proxy server cache 109. Other such objects would not be cached at the proxy server 108 to reduce the overhead that this entails. These other objects may be stored on remote servers 110. The frequency at which this overflow storage is employed may be varied as needed.

Proxy directories 106 do not have to store complete keys (e.g. URL's) to reference objects. For example, to save space, it is possible to store a hash (e.g. using MD5) of a key referencing an object in a proxy directory 106 instead of the key itself. In this way, less information about a reference object is needed to be stored thereby increasing fetch efficiency and reducing memory space needed. This compression or hashing may be performed in steps 212 and/or 216, for example.

In one embodiment, an accelerator 104 does not include a cache 105. In this case, accelerator 104 may still direct requests either to proxy server(s) 108 or to remote server(s) 110. Even without a cache, accelerator 104 reduces traffic to a proxy server 108 by offloading requests which accelerator 104 knows cannot be satisfied by a proxy server 108 by employing proxy directory 106.

In preferred embodiments, accelerator 104 is a web accelerator. The accelerator 104 is placed in front of a proxy server 108 (i.e., between the client 102, which may include a Web browser, and a proxy server 108). The proxy server 108 is preferably a web proxy server for interfacing with an Internet service provider (ISP). The accelerator includes a proxy directory 106 as described above. The proxy directory 106 can be compressed by hashing. If compression by hashing is used, multiple keys may map to a same hash bucket. Keys may include URLs for example. If any page in the proxy server 108 maps to a hash bucket, an entry is made in the proxy directory 106. This directory entry is only invalidated by the proxy server 108 if no URLs cached at the proxy server 108 map to the corresponding hash bucket. In accordance with the present invention, only a small fraction of traffic is routed to the proxy server 108, while the accelerator handles about 90% of the traffic. This results in a significant decrease in the amount of hardware needed to achieve a level of performance. Although illustratively described in terms of the Web or Internet-related objects, the present invention is also applicable to computer systems employing caching which are not caching Web or Internet-related objects. For example, the present invention is applicable to any client server network.

In another variation, an overloaded accelerator 104 can forward client requests to the proxy server 108 without consulting the proxy directory 106 (in block 204). The overload state can occur for example when the number of pending requests the accelerator must service exceeds a threshold. In addition, an overload state can occur when a high fraction of the recent requests were satisfied directly by the accelerator 104 (in block 206) or from a remote server 110 (blocks 214, 216). In some cases, the proxy directory 106 may include hints (i.e., information representing a likelihood that an object is stored in a cache) as to whether an object is cached in a proxy server 108 instead of completely accurate information. The present invention is still of utility for these situations. Performance improvements can still be obtained as long as the hints have a reasonable degree of accuracy. These hints may also be evaluated based on the probability of likelihood that the objects are included in a given cache. These probabilities may be employed to prioritize requests or for other tasks.

Having described preferred embodiments of a system and method for cache acceleration (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for satisfying requests between a client and a server, comprising the steps of:

providing a first entity with a directory of information about objects stored in a cache of a second entity, the first entity for receiving a request from a client;

determining whether the directory of information indicates that the request is satisfied by the cache of the second entity by querying the directory of information on the first entity;

sending the request to the second entity, if the directory indicates that the request is satisfied by the cache of the second entity; and otherwise, sending the request to be satisfied by another entity.

2. The method as recited in claim 1, wherein the first entity includes an accelerator.

3. The method as recited in claim 1, wherein the first entity includes at least one cache and the method further comprising the step of attempting to satisfy requests from a client by employing the at least one cache.

4. The method as recited in claim 3, further comprising the step of, in response to the at least one cache on the first entity including insufficient space, storing data in the cache of the second entity.

5. The method as recited in claim 1, wherein the second entity includes a proxy server.

6. The method as recited in claim 1, further comprising the step of compressing information included in the directory of information for referencing data in the cache.

7. The method as recited in claim 6, wherein the step of compressing information includes compressing at least some of the information using a hash function.

8. The method as recited in claim 1, wherein the directory of information includes hints of information included in the cache of the second entity.

9. A program storage device readable by machine, tangibly embodying a program of instructions executable by the machine to perform method steps for satisfying requests between a client and a server, the method steps comprising:

providing a first entity with a directory of information about objects stored in a cache of a second entity, the first entity for receiving a request from a client;

determining whether the directory of information indicates that the request is satisfied by the cache of the second entity by querying the directory of information on the first entity;

sending the request to the second entity, if the directory indicates that the request is satisfied by the cache of the second entity; and otherwise, sending the request to be satisfied by another entity.

10. The program storage device as recited in claim 9, wherein the first entity includes an accelerator.

11. The program storage device as recited in claim 10, wherein the first entity includes at least one cache and the method further comprising the step of attempting to satisfy requests from a client by employing the at least one cache.

12. The program storage device as recited in claim 11, further comprising the step of in response to the at least one cache on the first entity including insufficient space, storing data in the cache of the second entity.

13. The program storage device as recited in claim 9, wherein the second entity includes a proxy server.

14. The program storage device as recited in claim 9, further comprising the step of compressing information included in the directory of information for referencing data in the cache.

15. The program storage device as recited in claim 14, wherein the step of compressing information includes compressing at least some of the information using a hash function.

16. The program storage device as recited in claim 9, wherein the directory of information includes hints of information included in the cache of the second entity.

17. A system for accelerating interactions between a client and a server comprising:

an accelerator communicating with at least one client for receiving requests;

a proxy server coupled to the accelerator and including a first cache, the proxy server adapted for satisfying client requests for objects; and the accelerator further comprising a proxy directory for storing information about objects included in the first cache such that accelerator has access to information about objects stored in the first cache thereby preventing the need to access the proxy server for at least some requests.

18. The system as recited in claim 17, wherein the system includes a plurality of accelerators.

19. The system as recited in claim 17, wherein the system includes a plurality of proxy servers.

20. The system as recited in claim 17, wherein the proxy server includes a Web server.

21. The system as recited in claim 17, wherein the accelerator includes a second cache, the accelerator being adapted for satisfying client requests for objects by employing the second cache.

22. The system as recited in claim 21, further comprising remote servers for providing requested objects unavailable from the first cache and second cache.

23. The system as recited in claim 17, wherein the proxy directory includes compressed information for referencing objects in the first cache.

24. The system as recited in claim 23, wherein at least a portion of the compressed information is compressed using a hash function.

25. The system as recited in claim 17, wherein the proxy directory includes hints of information included in the first cache.

26. The method as recited in claim 1, wherein the directory of information includes information about objects stored in the cache of the second entity.

27. The program storage device as recited in claim 9, wherein the directory of information includes information about objects stored in the cache of the second entity.

28. The system as recited in claim 17, wherein the proxy directory includes information about objects stored in the cache of the second entity.

* * * * *